(12) United States Patent  
Hu

(10) Patent No.: US 9,958,616 B2  
(45) Date of Patent: May 1, 2018

(54) EMBEDDED OPTICAL FIBER MODULE

(71) Applicant: Dyi-Chung Hu, Hsinchu (TW)

(72) Inventor: Dyi-Chung Hu, Hsinchu (TW)

( * ) Notice: Subject to any disclaimer, the term of this patent is extended or adjusted under 35 U.S.C. 154(b) by 0 days. days.

(21) Appl. No.: 15/074,591

(22) Filed: Mar. 18, 2016

(65) Prior Publication Data

US 2016/0356961 A1 Dec. 8, 2016

Related U.S. Application Data

(60) Provisional application No. 62/171,448, filed on Jun. 5, 2015.

(51) Int. Cl.
*G02B 6/36* (2006.01)
*G02B 6/42* (2006.01)

(52) U.S. Cl.
CPC ........ *G02B 6/3608* (2013.01); *G02B 6/4214* (2013.01); *G02B 6/4253* (2013.01); *G02B 6/4255* (2013.01); *G02B 6/4257* (2013.01)

(58) Field of Classification Search
None
See application file for complete search history.

(56) References Cited

U.S. PATENT DOCUMENTS

| | | | | |
|---|---|---|---|---|
| 5,446,814 A * | 8/1995 | Kuo | .......................... | G02B 6/30 385/31 |
| 6,389,202 B1 * | 5/2002 | Delpiano | ............. | G02B 6/4214 385/14 |
| 7,125,176 B1 | 10/2006 | Stafford et al. | | |
| 7,136,551 B2 * | 11/2006 | Cho | .......................... | G02B 6/06 385/115 |
| 7,224,857 B2 * | 5/2007 | Liu | .......................... | G02B 6/43 250/214.1 |
| 7,263,256 B2 * | 8/2007 | Kim | .......................... | G02B 6/43 385/31 |
| 7,289,701 B2 * | 10/2007 | Lam | ...................... | G02B 6/4204 385/49 |
| 7,526,153 B2 * | 4/2009 | Uchida | ..................... | G02B 6/43 385/15 |
| 7,529,439 B2 * | 5/2009 | Kim | ..................... | G02B 6/4214 385/14 |
| 7,551,811 B2 * | 6/2009 | Aoki | ..................... | G02B 6/1221 385/14 |
| 7,561,762 B2 * | 7/2009 | Miyoshi | ................... | G02B 6/42 385/14 |
| 7,577,323 B2 * | 8/2009 | Iwamori | ............ | G02B 6/12002 257/734 |
| 7,623,743 B2 * | 11/2009 | Furuyama | ............ | G02B 6/4221 385/14 |

(Continued)

FOREIGN PATENT DOCUMENTS

TW 200409979 6/2004

OTHER PUBLICATIONS

"Office Action of Taiwan Counterpart Application," dated Feb. 7, 2018, p. 1-p. 10, in which the listed references were cited.

*Primary Examiner* — Tina Wong

(74) *Attorney, Agent, or Firm* — JCIPRNET

(57) ABSTRACT

An embedded optical fiber module is disclosed. The embedded optical fiber module is adapted to fit in a recess of a package substrate. The embedded optical fiber module is configured for optical signal transmission between different chips or electronic devices mounted on the package substrate.

8 Claims, 14 Drawing Sheets

(56) References Cited

U.S. PATENT DOCUMENTS

| | | | |
|---|---|---|---|
| 7,639,912 B2* | 12/2009 | Wang | G02B 6/12002 385/14 |
| 7,680,367 B2* | 3/2010 | Matsuoka | G02B 6/43 385/129 |
| 7,713,767 B2* | 5/2010 | Chan | G02B 6/132 257/E21.598 |
| 7,796,851 B2* | 9/2010 | Yonekura | G02B 6/4214 385/129 |
| 8,542,963 B2* | 9/2013 | Nakagawa | B29D 11/0075 385/14 |
| 2006/0133718 A1 | 6/2006 | Liu | |
| 2006/0215963 A1* | 9/2006 | Hamano | G02B 6/30 385/49 |
| 2008/0044127 A1* | 2/2008 | Leising | G02B 6/12004 385/14 |

* cited by examiner

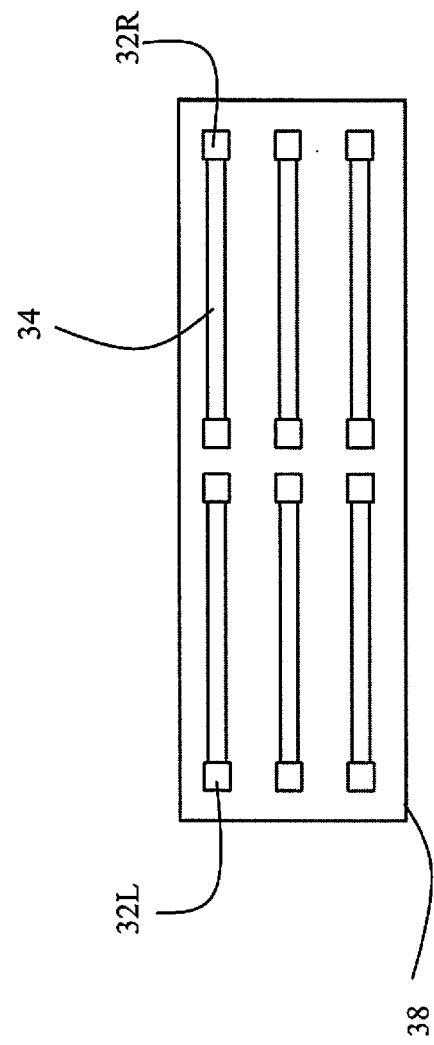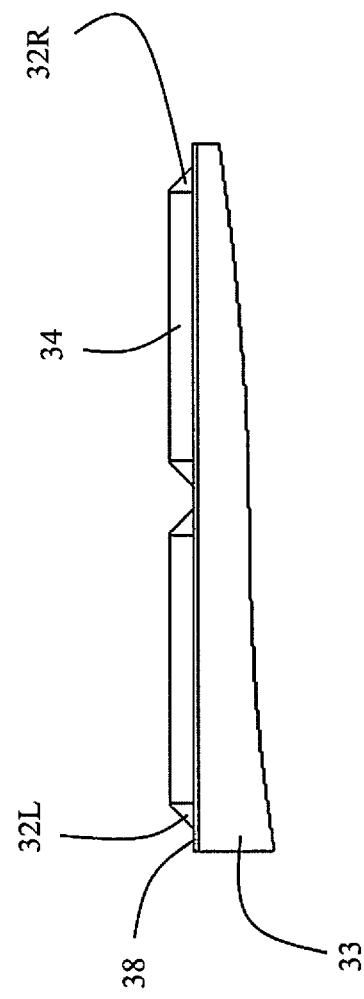

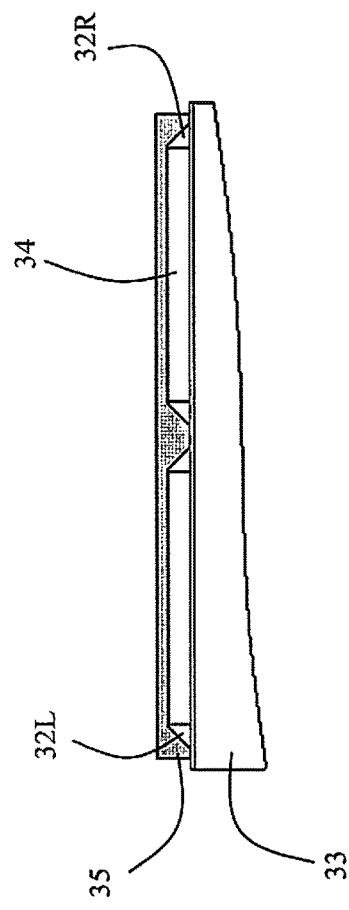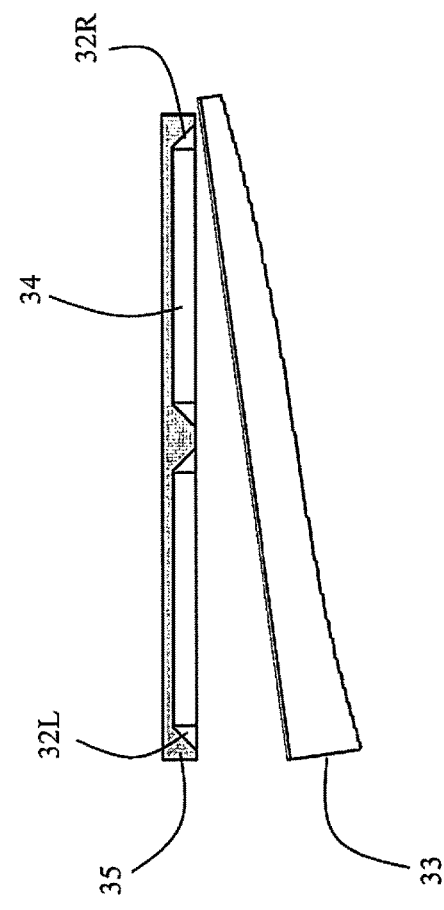
Fig.3A
Fig.3B

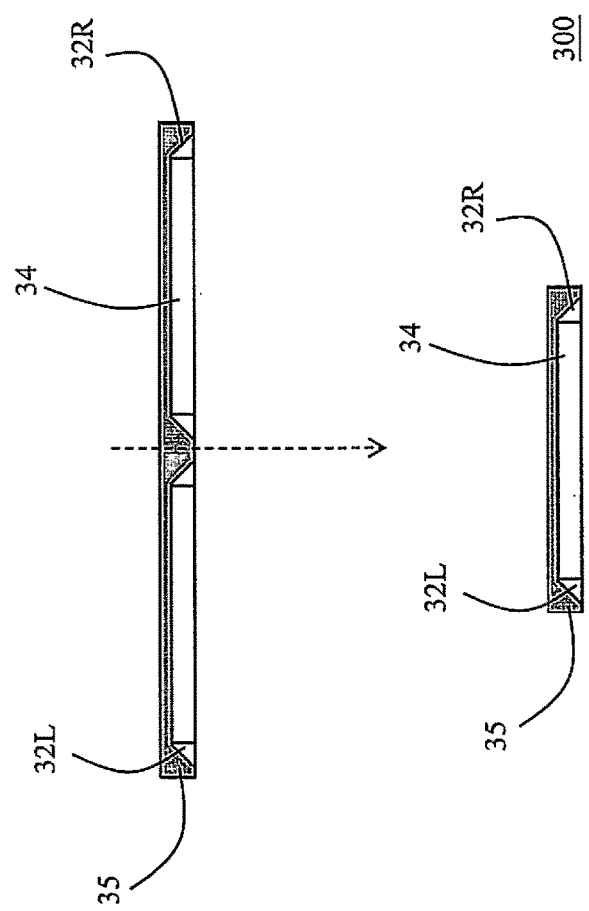

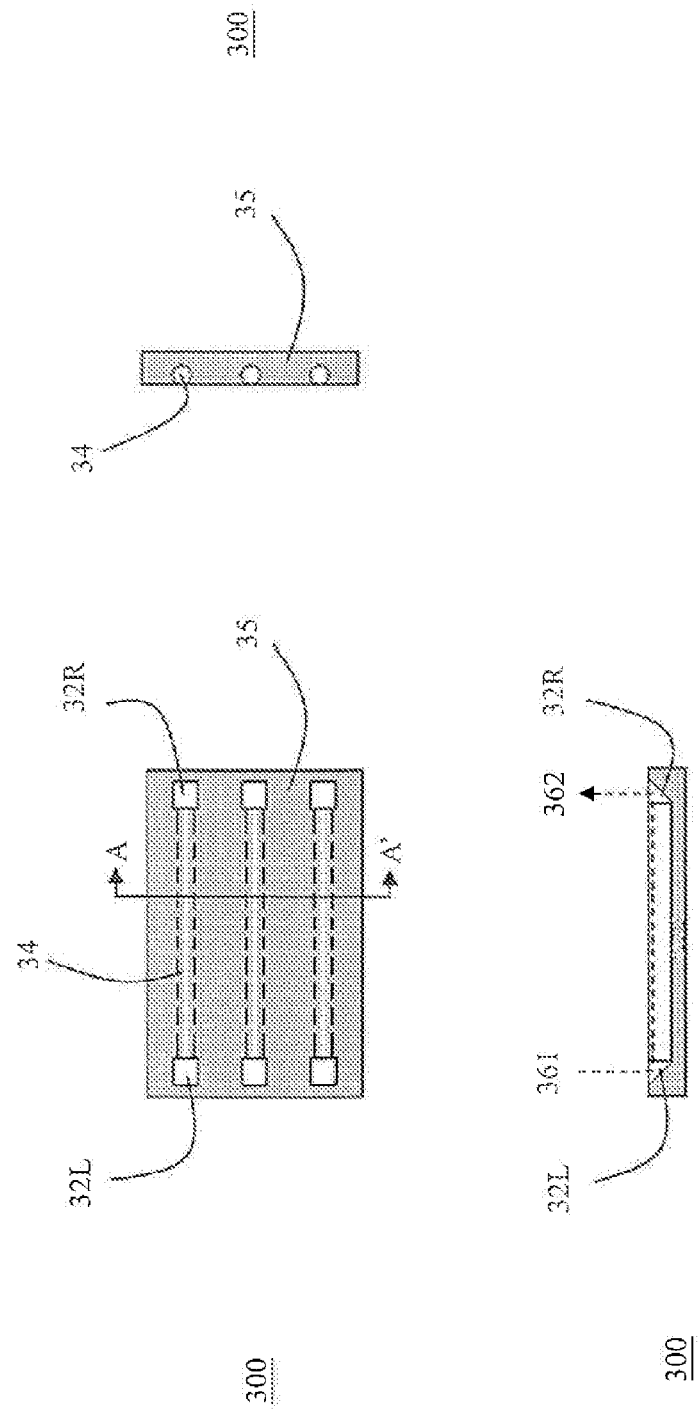

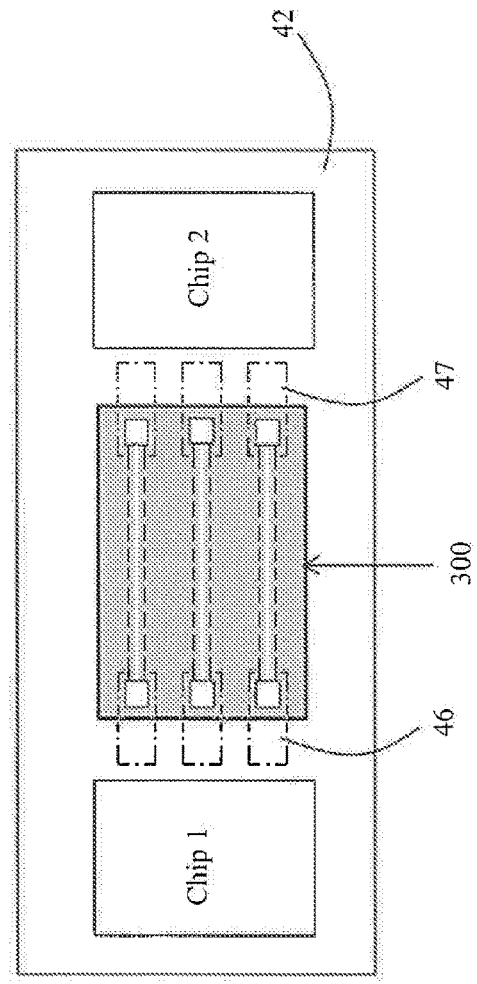
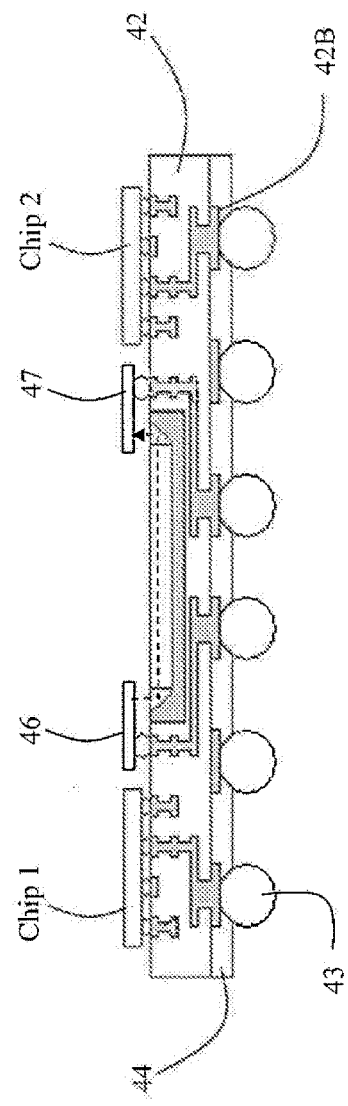
Fig.7A
Fig.7B

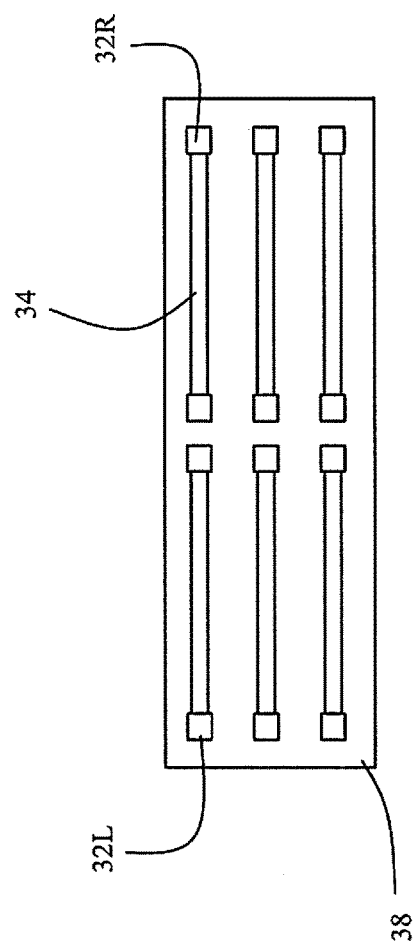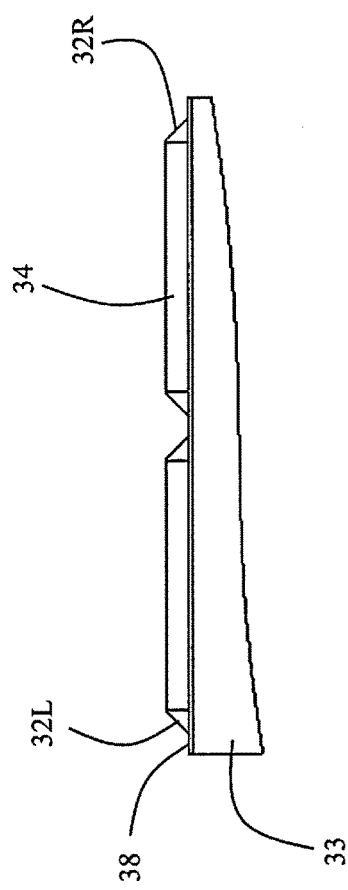
Fig.8A
Fig.8B

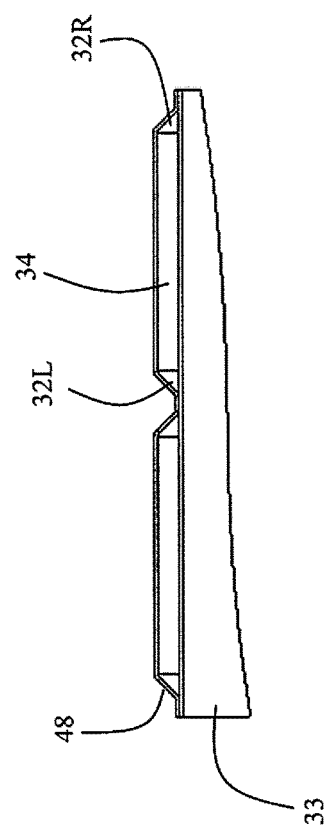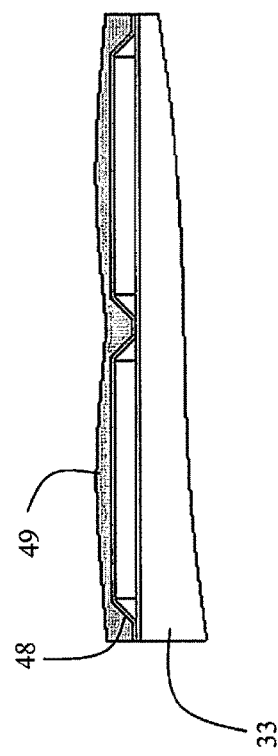

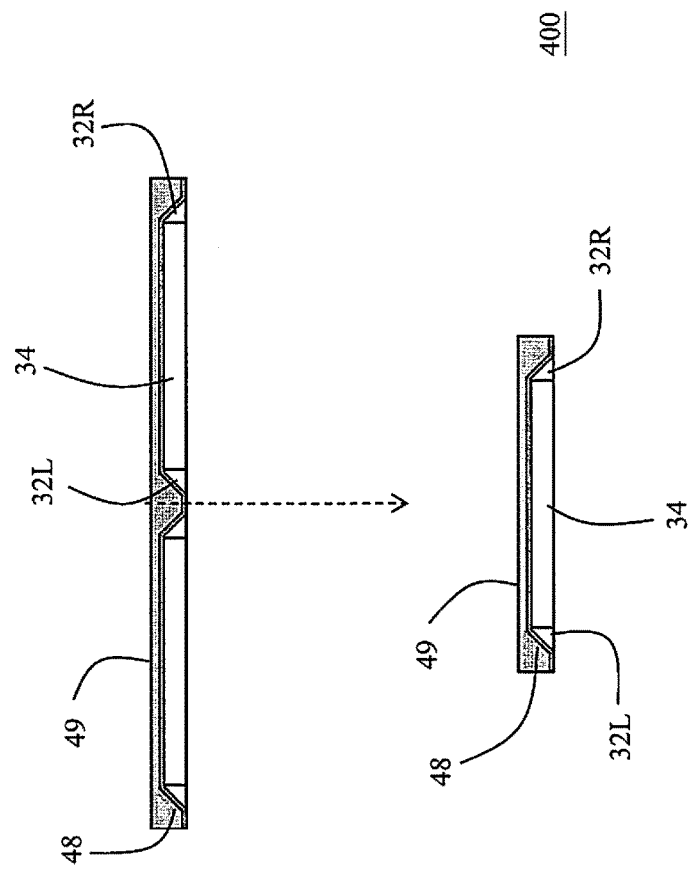

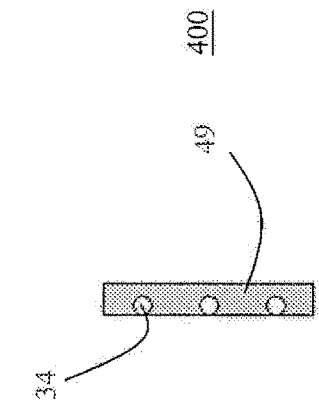
Fig.12C
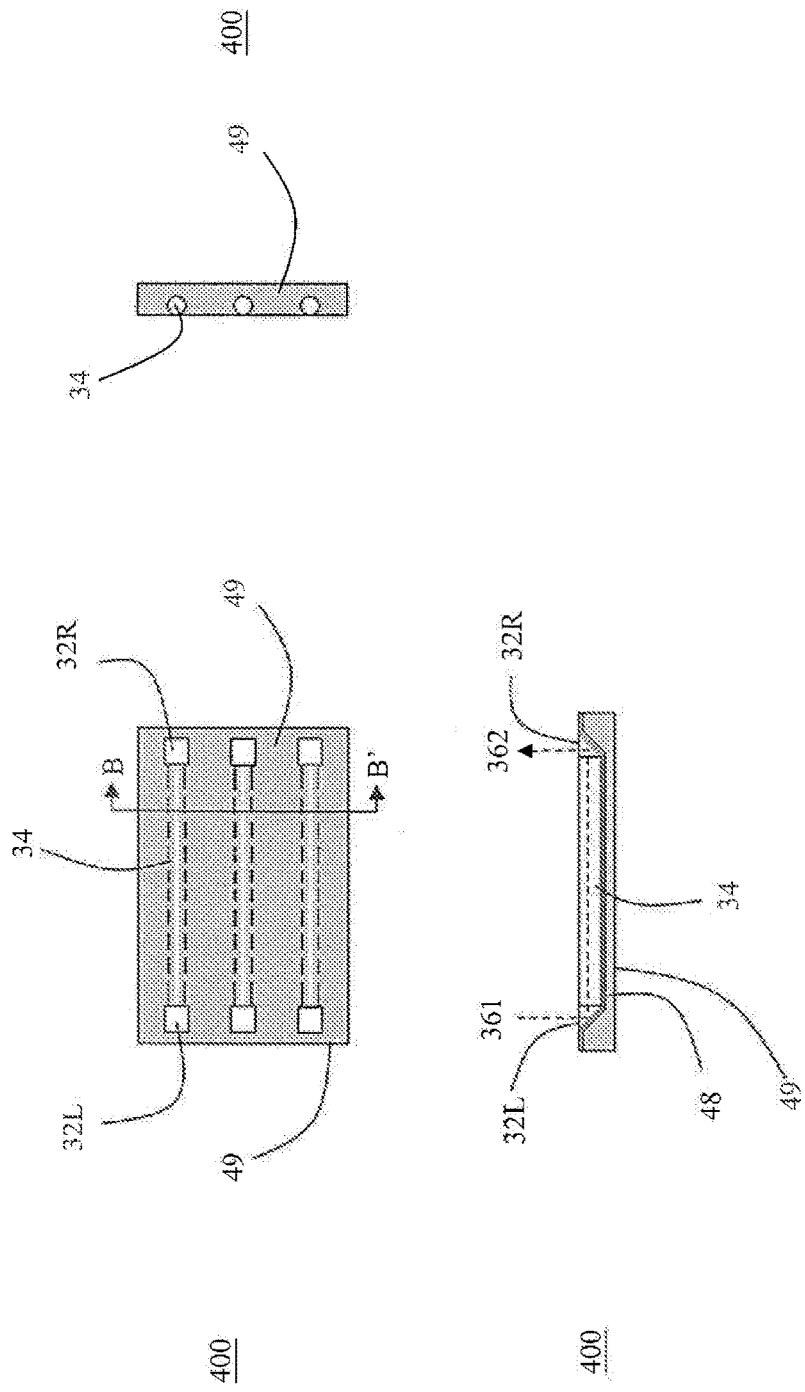
Fig.12A
Fig.12B

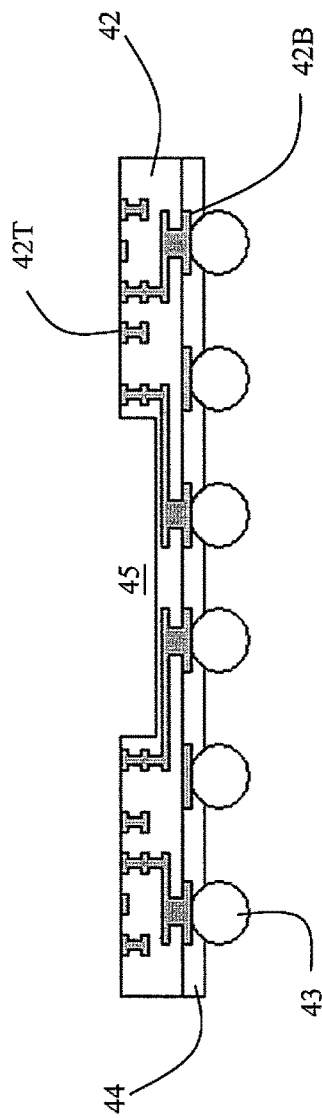
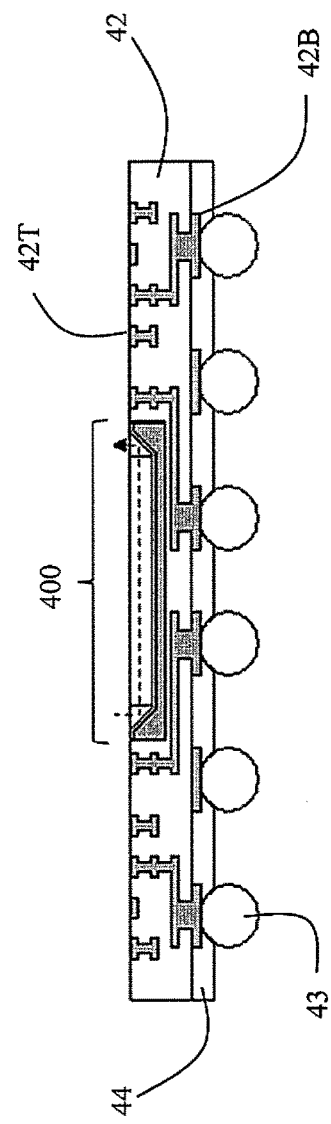

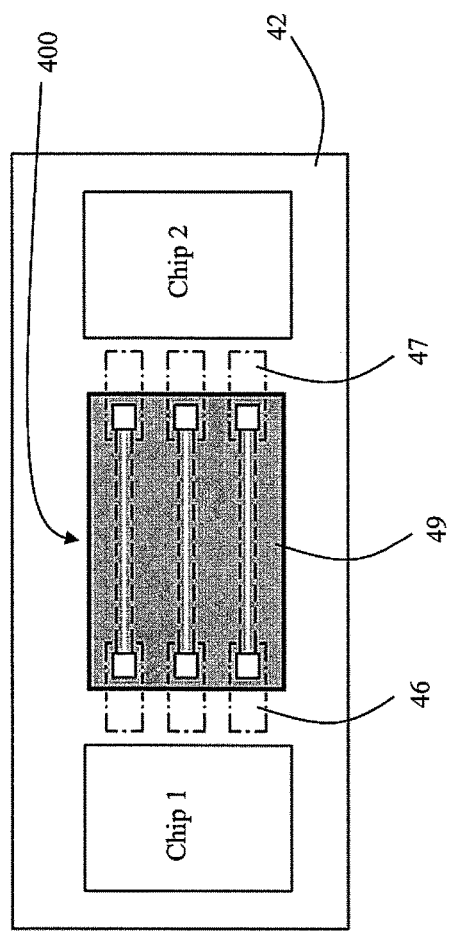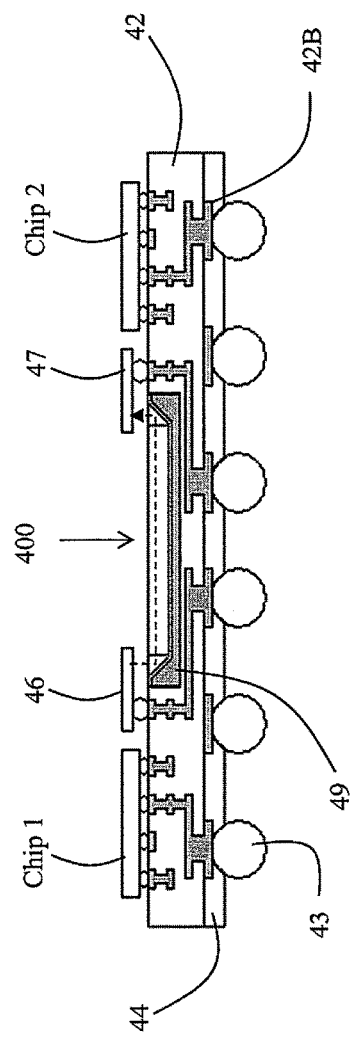
Fig.14A
Fig.14B

EMBEDDED OPTICAL FIBER MODULE

RELATED APPLICATIONS

The present application claims the benefit of U.S. Provisional Application No. 62/171,448, filed Jun. 5, 2015, the disclosure of which is hereby incorporated by reference herein in its entirety.

BACKGROUND

Technical Field

The present invention relates to embedded optical fibers, especially for an embedded optical fiber module adapted to fit in a recess of a package substrate for a chip or chips for optical signal communication.

Description of Related Art

FIG. 1 shows a prior art.

FIG. 1A shows that U.S. Pat. No. 7,125,176 disclosed an optical fiber 14 is configured in an elongated mounting groove 20 which is formed in a surface of a stiffening plate 16 made in a printed circuit board 12. Groove 20 has a generally rectangular shaped cross-section with a depth and width approximately equal to a diameter of the length of the optical fiber 14. Groove 20 is fabricated with a width and depth slightly greater than the outside diameter of optical fiber 14.

The prior art shows that an elongated mounting groove 20 has to be made for housing each optical fiber 14 individually. The complicated fabricating processes cost much. A simpler process to reduce the fabrication cost is desired for a long time. A simpler fabricating process for embedded optical fibers is developed in the present invention.

BRIEF DESCRIPTION OF THE DRAWINGS

FIGS. 2A~4B show a fabricating process for a first embodiment according to the present invention.

FIGS. 5A~5C show different views of the first embodiment.

FIGS. 6A~7B show the first embodiment embedded in a package substrate.

FIGS. 8A~11B show a fabricating process for a second embodiment according to the present invention.

FIGS. 12A~12C show different views of the second embodiment.

FIGS. 13A~14B show the second embodiment embedded in a package substrate.

DETAILED DESCRIPTION OF THE INVENTION

Figure 1:
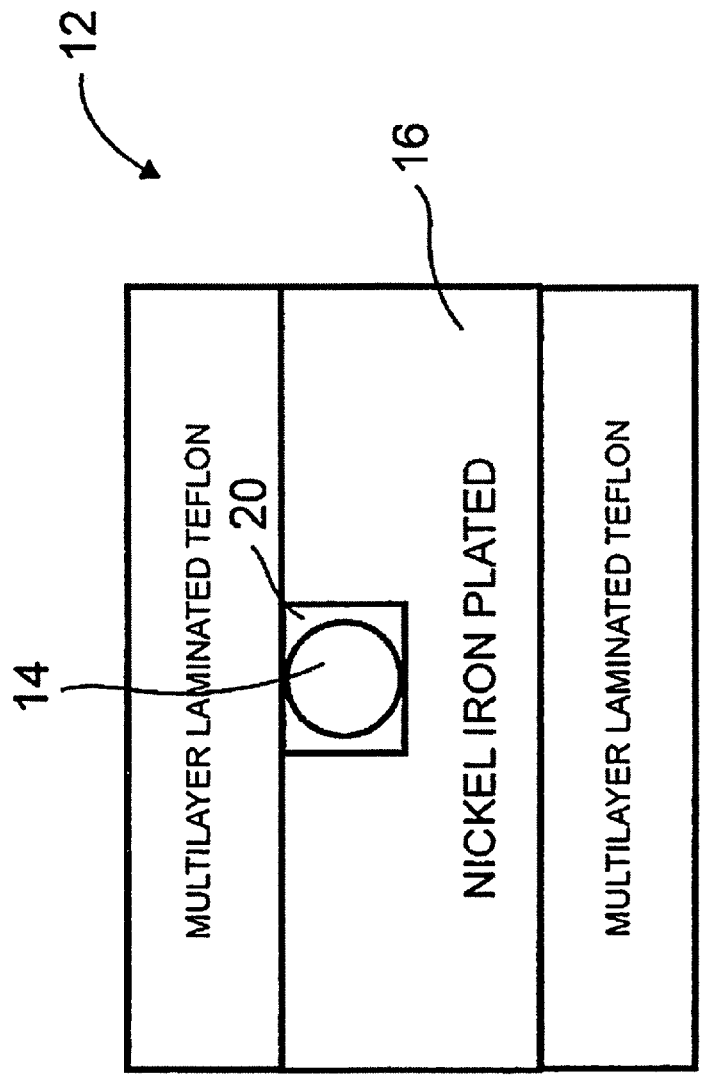
FIG. 1 shows a prior art.

A thin film module embedded with a plurality of optical fibers is disclosed. The embedded optical fiber module is adapted to fit in a recess of a package substrate for optical signal transmission.

FIGS. 2A~4B show a fabricating process for a first embodiment according to the present invention.

FIG. 2A shows a top view of FIG. 2B.

Firstly, please refer to FIG. 2B. FIG. 2B shows:

preparing a temporary carrier 33;

applying an adhesive layer 38 on a top surface of the temporary carrier 33;

configuring a plurality of optical fibers 34 on a top surface of the adhesive layer 38; wherein a first reflection mirror 32L is configured on a first end of each optical fiber 34, and a second reflection mirror 32R is configured on a second end of each optical fiber 34;

FIG. 2A shows a top view of FIG. 2B.

FIG. 2A shows a plurality of optical fibers 34 configured on a top surface of the adhesive layer 38 which is applied on a top surface of a temporary carrier 33. A first reflection mirror 32L is configured in a first end of each optical fiber 34 and a second reflection mirror 32R is configured in a second end of each optical fiber 34.

FIG. 3A shows:

applying a thin film protection layer 35 to cover the optical fibers 34;

FIG. 3B shows:

detaching the temporary carrier 33;

FIG. 4A shows:

yielding an embedded optical fiber module 34; and

FIG. 4B shows:

singulating the sheet module; and yielding a plurality of embedded optical fiber modules 300.

FIGS. 5A~5C show different views of the first embodiment.

FIG. 5A shows a top view of FIG. 5B. Firstly, please refer to FIG. 5B.

FIG. 5B shows a thin film module unit 300 of FIG. 4B

FIG. 5B shows a thin film module unit 300 of FIG. 4B but configured in a reversed view. FIG. 5B shows a thin film module unit with embedded optical fibers 300. A left reflection mirror 32L is configured in a first end of each optical fiber 34 to reflect light beams 361 from top into the optical fiber 34; a right reflection mirror 32R is configured in a second end of each optical fiber 34 to reflect the light beams 362 coming from the optical fiber 34 upwards.

FIG. 5A shows a top view of FIG. 5B.

FIG. 5A shows a plurality of optical fibers 34 embedded in the thin film protection layer 35. A top surface of the left reflection mirror 32L is exposed out of the thin film protection layer 35. Similarly, a top surface of the right reflection mirror 32R is exposed out of the thin film protection layer 35.

FIG. 5C shows a section view of FIG. 5A

FIG. 5C shows the thin film protection layer 35 wraps almost the whole optical fiber 34 so that the optical fiber 34 can be hold firmly in position.

FIGS. 6A~7B show the first embodiment embedded in a package substrate.

Figure 6A:
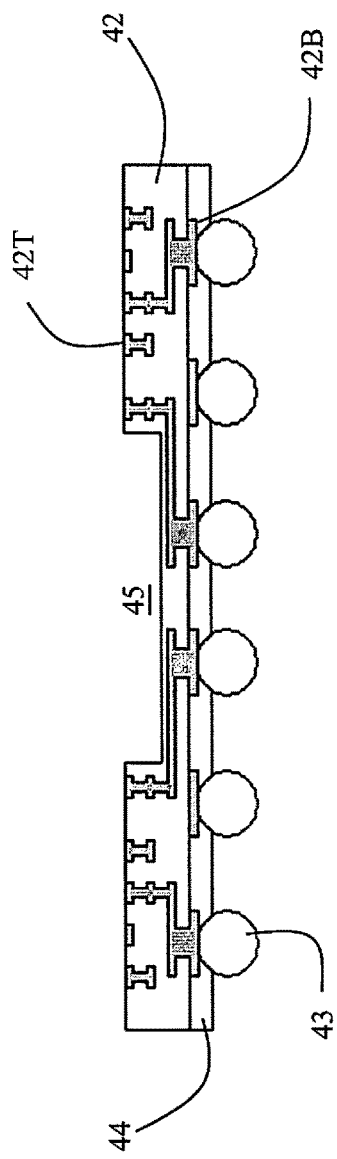

FIG. 6A shows a package substrate 42 having a recess 45. A plurality of top pads 42T is configured on a top surface of the package substrate 42. The top pads 42T are made according to a design rule matching with a chip to facilitate at least one chip configured thereon. A plurality of bottom pads 42B is configured on a bottom surface of the package substrate 42. The bottom pads 42B are made according to a design rule matching with a circuit board to facilitate the package mounted onto an outside mother board (not shown). A solder resist 44 is applied on a bottom surface of the bottom pads 42B to expose partial bottom surface of each bottom pad 42B so that a solder ball 43 can be mounted thereon.

Figure 6B:
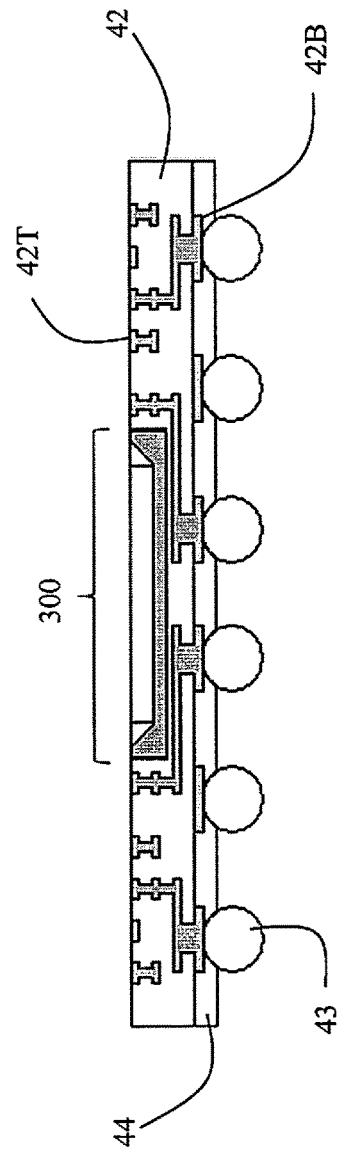

FIG. 6B shows a thin film module unit 300 is fitted in the recess 45 of the package substrate 42.

FIG. 7A shows a top view of FIG. 7B. Firstly, please refer to FIG. 7B.

FIG. 7B shows a light diode 46 is configured on a left top side of the package substrate 42 with a portion configured on a top side of the first reflection mirror 32L so that light beams emitted from the first chip shall be reflected into the optical fiber 34. A light sensor 47 is configured on a right top side of the package substrate 42 with a portion configured on a top side of the second reflection mirror 32R so that light beams reflected by the second reflection mirror 32R can be detected by the sensor 37. Chip 1 is exemplified to be configured on a left top side of the package substrate 42, light diode 46 can be, for example, controlled by chip 1. Chip 2 is exemplified to be configured on a right top side of the package substrate 42, light sensor 47 can be, for example, controlled by chip 2.

The light diode 46 is configured at least partially on top of the first reflection mirror 32L so that the light beams emitted from the light diode 46 are able to enter the reflection mirror 32L. The light sensor 47 is configured at least partially on top of the second reflection mirror 32R so that the light beams reflected from the second reflection mirror 32R are able to reach the light sensor 47.

FIG. 7A shows chip 1 and a light diode 46 configured on a left top surface of the package substrate 42. FIG. 7A also shows chip 2 and a light sensor 47 are configured on a right top surface of the package substrate 42.

FIGS. 8A~11B show a fabricating process for a second embodiment according to the present invention.

FIG. 8A shows a top view of FIG. 8B. Firstly, please refer to FIG. 8B.

FIG. 8B shows:
preparing a temporary carrier 33;
applying an adhesive layer 38 on a top surface of the temporary carrier 33;
configuring a plurality of optical fibers 34 on a top surface of the adhesive layer 38; wherein
a first reflection mirror 32L is configured on a first end of each optical fiber 34, and a second reflection mirror 32R is configured on a second end of each optical fiber 34;

FIG. 8A is the same as FIG. 2A, for simplification, the description to FIG. 8A is omitted herein.

Figure 10A:
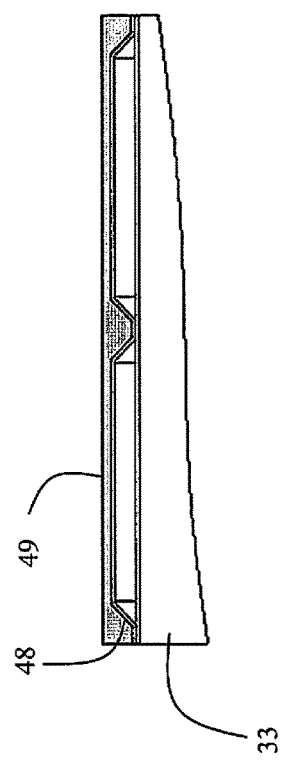
Figure 10B:
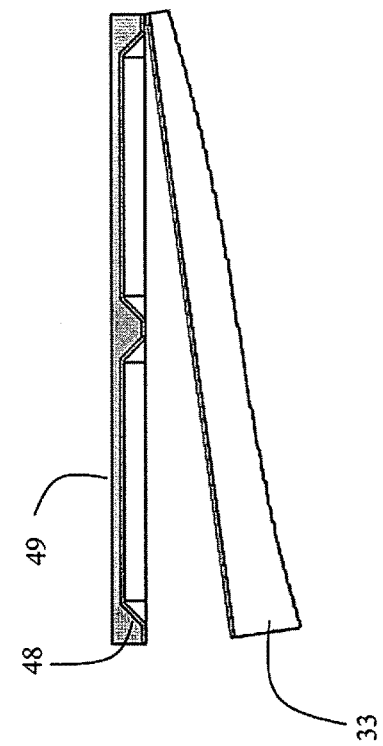

FIG. 9A shows:
applying a seed layer 48 to cover the optical fibers 34;
FIG. 9B shows:
plating a protection layer of metal 49 to cover the optical fibers 34;
FIG. 10A shows:
flattening the metal layer 49;
FIG. 10B shows:
detaching the temporary carrier 33;
FIG. 11A shows:
yielding an embedded optical fiber module 34; and
FIG. 11B shows:
singulating the sheet module; and
yielding a plurality of embedded optical fiber modules 400.

FIGS. 12A~12C show different views of the second embodiment.

FIG. 12A shows a top view of FIG. 12B. Firstly, please refer to FIG. 12B.

FIG. 12B shows a thin film module unit 400 of FIG. 11B but configured in a reversed view. FIG. 12B shows a thin film module unit with embedded optical fibers 400. A left reflection mirror 32L is configured in a first end of each optical fiber 34 to reflect light beams 361 from top into the optical fiber 34; right reflection mirror 32R is configured in a second end of each optical fiber 34 to reflect the light beams 362 coming from the optical fiber 34 upwards.

FIG. 12A shows a top view of FIG. 12B.

FIG. 12A shows a plurality of optical fibers 34 embedded in the thin film protection layer 49. A top surface of the left reflection mirror 32L is exposed out of the thin film protection layer 49. Similarly, a top surface of the right reflection mirror 32R is exposed out of the thin film protection layer 49.

FIG. 12C shows a section view of FIG. 12A

FIG. 12C shows the metal thin film protection layer 49 wraps almost the whole optical fiber 34 so that the optical fiber 34 can be hold firmly in position.

FIGS. 13A~14B show the second embodiment embedded in a package substrate.

FIGS. 13A~14B are similar to FIGS. 6A~7B respectively. A detailed description to FIG. 13A~14B is omitted herein, the only difference is that a thin film module unit 400 is embedded in the recess 45.

According to the present invention, the first reflection mirror 32L can be a first isosceles right angle prism, and the second reflection mirror 32R can be a second isosceles right angle prism. The thin film protection layer is one selected from a group consisting of molding compound 35 and metal 49. The molding compound thin film protection layer 35 is one selected from a group consisting of epoxy resin and polyimide. The metal thin film protection layer 49 is selected from a group consisting of Au, Ag, Cu, Al, Pd, Pt, Ni, Co, and Zn.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. An embedded optical fiber module, comprising:
a protection layer;
a plurality of optical fibers embedded in the protection layer; and
for each optical fiber of the plurality of optical fibers,
a first reflection mirror on a first end of the optical fiber for reflecting incoming light into the optical fiber; and
a second reflection mirror on a second end of the optical fiber for reflecting the light out of the optical fiber,
wherein the first reflection mirror is a first isosceles right angle prism, and the second reflection mirror is a second isosceles right angle prism,
wherein one of the isosceles side of the first isosceles right angle prism is exposed out of a top surface of the protection layer, one of the isosceles side of the second isosceles right angle prism is exposed out of the top surface of the protection layer, and
wherein a side of each of the plurality of optical fibers is flush with the isosceles sides of the first and second isosceles right angle prisms which are exposed out of the top surface of the protection layer.

2. An embedded optical fiber module as claimed in claim 1, wherein
the protection layer is one selected from the group consisting of a molding compound and a metal.

3. An embedded optical fiber module as claimed in claim 2, wherein the molding compound is one selected from the group consisting of epoxy resin and polyimide.

4. An embedded optical fiber module as claimed in claim 2, wherein the metal is selected from the group consisting of Au, Ag, Cu, Al, Pd, Pt, Ni, Co, and Zn.

5. A package substrate, comprising:
a plurality of metal pads on a top side of the package substrate, and configured to mount at least one chip thereon;
a recess opened to the top side of the package substrate;
a plurality of bottom metal pads on a bottom side of the package substrate, and configured to mount the package substrate onto a circuit board; and
an embedded optical fiber module in the recess, the embedded optical fiber module comprising:
    a plurality of optical fibers;
    a protection layer wrapping the plurality of optical fibers; and
    for each optical fiber of the plurality of optical fibers,
        a first reflection mirror on a first end of optical fiber for reflecting incoming light into the optical fiber; and
        a second reflection mirror on a second end of the optical fiber for reflecting the light out of the optical fiber,
        wherein a side of each of the plurality of optical fibers is flush with surfaces of the first and second reflection mirrors which are exposed out of a top surface of the protection layer.

6. A package substrate as claimed in claim 5, wherein the protection layer is one selected from the group consisting of a molding compound and a metal.

7. An embedded optical fiber module as claimed in claim 1, further comprising:
a seed layer arranged between, and in direct contact with,
(i) the protection layer which is a metal layer, and
(ii) the plurality of optical fibers and the corresponding first and second reflection mirrors.

8. A package substrate as claimed in claim 5,
further comprising:
a light emitting device mounted on and electrically connected to at least one of the plurality of top metal pads;
a light sensor mounted on and electrically connected to at least one of the plurality of top metal pads, wherein the light emitting device and the light sensor are optically aligned with the first and second reflection mirrors, respectively, on the first and second ends, respectively, of an optical fiber among the plurality of optical fibers to input the incoming light into the optical fiber and receive the light reflected out of the optical fiber, respectively;
a first chip mounted on and electrically connected to at least one of the plurality of top metal pads, the first chip configured to control the light emitting device; and
a second chip mounted on and electrically connected to at least one of the plurality of top metal pads, the second chip configured to control the light sensor.

* * * * *